United States Patent
Lee et al.

(10) Patent No.: US 9,007,693 B2
(45) Date of Patent: Apr. 14, 2015

(54) VIDEO WALL AND MULLION ELIMINATION LENS THEREOF

(71) Applicant: Hon Hai Precision Industry Co., Ltd., New Taipei (TW)

(72) Inventors: Han-Lung Lee, New Taipei (TW); Shan-Fu Huang, New Taipei (TW); Ho-Chiang Liu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/093,047

(22) Filed: Nov. 29, 2013

(65) Prior Publication Data

US 2014/0177062 A1   Jun. 26, 2014

(30) Foreign Application Priority Data

Dec. 24, 2012   (TW) .............................. 101149436 A

(51) Int. Cl.
*G02B 27/14*   (2006.01)
*G02B 3/08*    (2006.01)
*G02B 27/10*   (2006.01)
*G02B 27/12*   (2006.01)

(52) U.S. Cl.
CPC ............ *G02B 27/1066* (2013.01); *G02B 27/14* (2013.01); *G02B 27/10* (2013.01); *G02B 27/123* (2013.01); *G02B 3/08* (2013.01)

(58) Field of Classification Search
CPC .. G02B 27/10; G02B 27/1066; G02B 27/123; G02B 27/14; G02B 3/08
USPC ......... 359/362, 629–631, 618, 708, 738, 741; 362/244, 610; 353/31; 345/83, 88, 690
See application file for complete search history.

(56) References Cited

U.S. PATENT DOCUMENTS

| | | | | |
|---|---|---|---|---|
| 4,767,172 A * | 8/1988 | Nichols et al. | ................ | 385/146 |
| 5,173,810 A * | 12/1992 | Yamakawa | .................... | 359/819 |
| 5,757,557 A * | 5/1998 | Medvedev et al. | ............ | 359/708 |
| 7,817,357 B2 * | 10/2010 | Mitani et al. | .................. | 359/802 |
| 8,692,737 B2 * | 4/2014 | Watanabe et al. | .............. | 345/1.3 |
| 8,797,234 B2 * | 8/2014 | Watanabe et al. | .............. | 345/1.3 |

* cited by examiner

*Primary Examiner* — Loha Ben
(74) *Attorney, Agent, or Firm* — Novak Druce Connolly Bove + Quigg LLP

(57) ABSTRACT

An exemplary video wall includes two display panels and a polygonal mullion elimination lens. Each of the display panels includes a main body and a bezel surrounding the main body. The polygonal mullion elimination lens includes a central first concave surface configured to reflect internal light incident thereon, two flat surfaces respectively attached to the main bodies of the display panels, a central second concave surface opposite to the first concave surface, and two lateral surfaces each connecting between a corresponding one of the flat surfaces and the second concave surface. Portions of light emitted by the main bodies of the display panels can enter the mullion elimination lens via the flat surfaces.

6 Claims, 4 Drawing Sheets

VIDEO WALL AND MULLION ELIMINATION LENS THEREOF

BACKGROUND

1. Technical Field

The present disclosure relates to a video wall and a mullion elimination lens for the video wall.

2. Description of Related Art

In recent years, there has been an increase in the demand for video walls for displaying information. Video walls are often found in control centers, and sports venues, and other large public places. FIGS. 1-2 show that a typical video wall 100a is comprised of several display panels 10a. The display panels 10a usually have narrow bezels 12a, which form black gaps (also called mullions) between adjacent active display areas 11a, as shown in FIG. 2.

Video processors that drive the display panels 10a can compensate the existence of the mullions, and thereby reducing the viewed width of the mullions. Nevertheless, the mullions are still visible and affect the aesthetic appearance of the displayed content. Thus, there is a need for a video wall which can eliminate the mullions formed by the bezels 12a.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail, with reference to the accompanying drawings.

Figure 1:
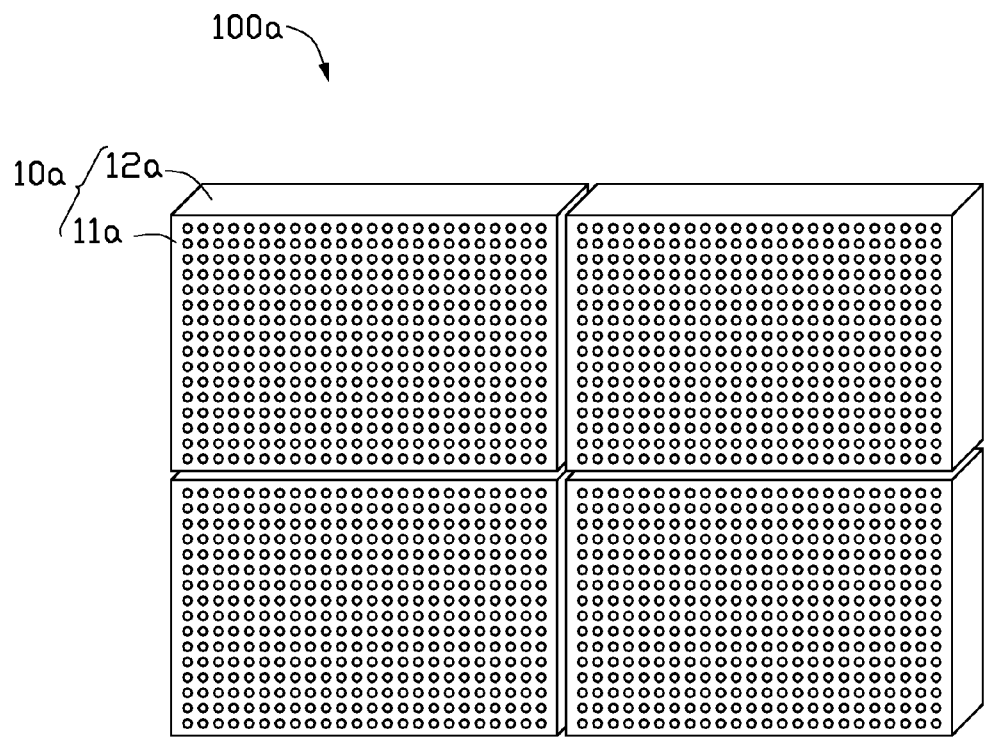
FIG. 1 is a schematic, isometric view of a conventional video wall.
Figure 2:
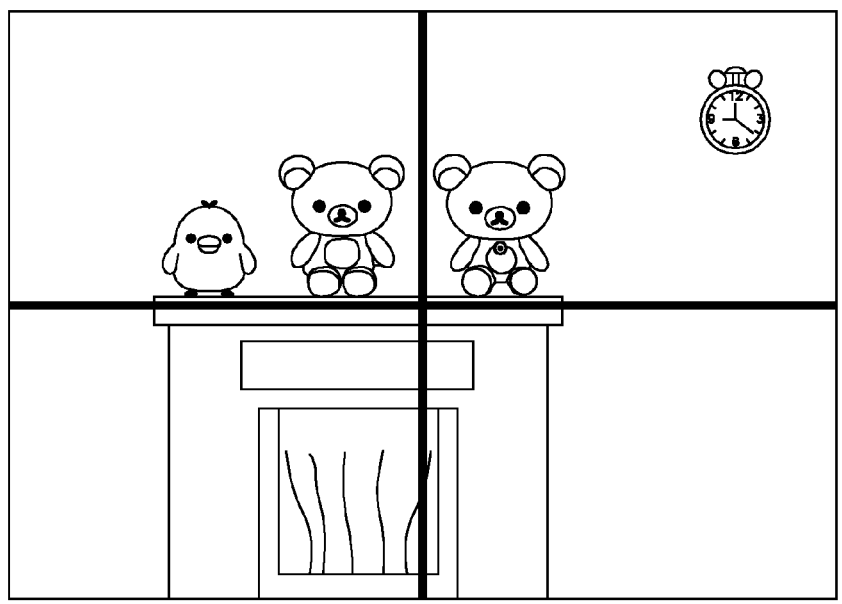
FIG. 2 is a plan view of the video wall of FIG. 1 when displaying an image.
Figure 3:
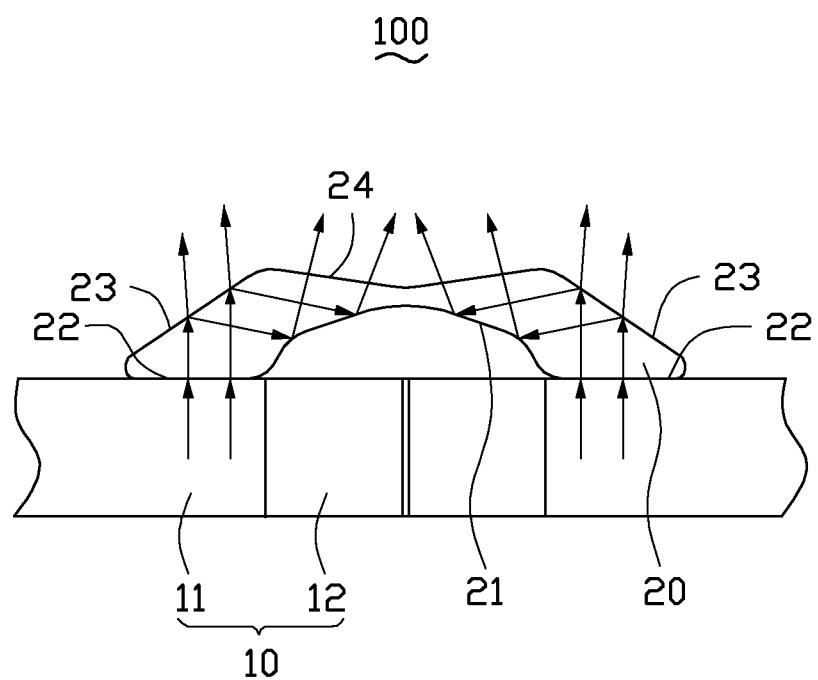
FIG. 3 is a schematic, cross-sectional view of part of a video wall with a mullion elimination lens according to an exemplary embodiment, showing essential optical parts thereof.

FIG. 3 shows part of a video wall 100 according to an exemplary embodiment. The video wall 100 includes two display panels 10 and a mullion elimination lens 20. The term "mullion(s)" refers to the junction(s) or border(s) between adjacent display devices in a video wall at which the large image being cooperatively displayed by the various display devices of the video wall is typically interrupted or distorted. The effect may be compared to viewing a scene through a window composed of an array of smaller panes of glass that are divided by vertical mullions and horizontal transoms which partially obscure the scene beyond the window.

Each display panel 10 includes a main body 11 for displaying information and a bezel (or frame) 12. The main body 11 is substantially rectangular and the bezel 12 surrounds the main body 11.

Figure 4:
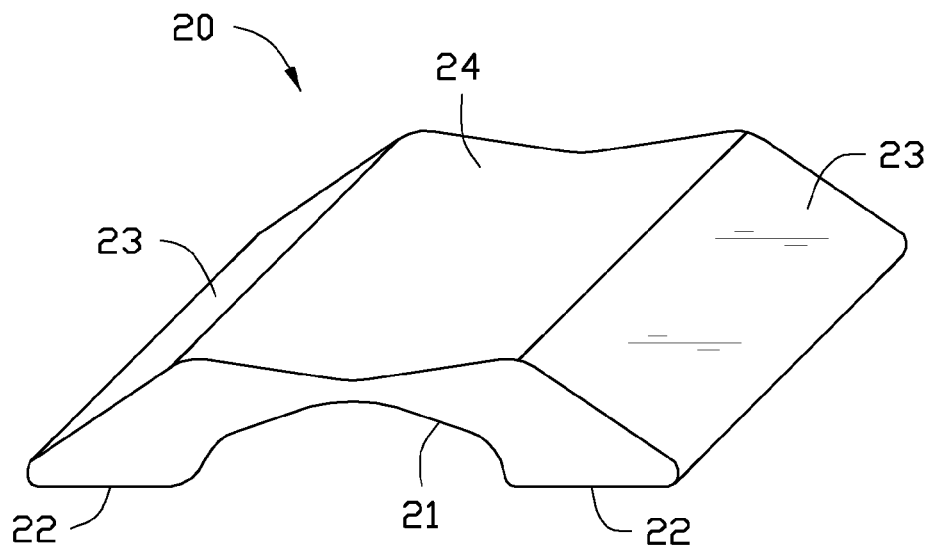
FIG. 4 is an isometric view of the mullion elimination lens of FIG. 3.

FIG. 4 shows that the mullion elimination lens 20 is substantially polygonal, and symmetrical about a center plane (not shown) thereof. The mullion elimination lens 20 includes, at a lower side, a first concave surface 21, and two coplanar flat surfaces 22. The mullion elimination lens 20 further includes, at an upper side, a second concave surface 24 above the first concave surface 21, and two flat, oblique lateral surfaces 23 each connecting between one of the two flat surfaces 22 and the second concave surface 24. The first concave surface 21 is reflective and capable of effectively reflecting light from the two lateral surfaces 23. In the embodiment, the mullion elimination lens 20 is integrally formed of transparent material.

In the illustrated embodiment, each flat surface 22 smoothly connects with the first concave surface 21 via a rounded fillet, and smoothly connects with the corresponding lateral surface 23 via a rounded fillet. Each lateral surface 23 smoothly connects with the second concave surface 24 via a rounded fillet. The second concave surface 24 comprises two symmetrical, oblique flat portions that meet at a middle of the second concave surface 24 via a rounded fillet. The first concave surface 21 comprises a central curved portion, two symmetrical, oblique first flat portions extending from opposite sides of the central curved portion, respectively, and two symmetrical, oblique second flat portions extending from the first flat portions via rounded fillets, respectively. The second flat portions smoothly connect with the corresponding flat surfaces 22 via the rounded fillets, respectively.

In assembly of the video wall 100, the flat surfaces 22 are attached to the main bodies 11 of the corresponding display panels 10, and the first concave surface 21 is substantially above the adjacent bezels 12 of the corresponding display panels 10.

In use of the video wall 100, a portion of the light emitted by the main body 11 of each display panel 10 enters the mullion elimination lens 20 via the corresponding flat surface 22, and travels to the corresponding lateral surface 23. A portion of the light incident on the lateral surface 23 penetrates the lateral surface 23. The remaining portion of the incident light is reflected by the lateral surface 23 to the first concave surface 21, and is reflected by the first concave surface 21 and passes out from the mullion elimination lens 20 through the second concave surface 24 to the exterior. By such process, a mullion that would otherwise be formed by the adjacent bezels 12 is substantially eliminated by the mullion elimination lens 20.

While various embodiments have been described and illustrated, the disclosure is not to be construed as being limited thereto. Various modifications can be made to the embodiments by those skilled in the art without departing from the true spirit and scope of the disclosure.

What is claimed is:

1. A video wall comprising:
   at least two display panels, each of the at least two display panels comprising a main body and a bezel surrounding the main body; and
   at least one polygonal mullion elimination lens comprising:
   a central first concave surface configured to reflect internal light incident thereon;
   two flat surfaces respectively attached to the main bodies of two adjacent of the at least two display panels, thereby allowing portions of light emitted by the main bodies of the two adjacent display panels to enter the at least one mullion elimination lens via the flat surfaces;
   a central second concave surface opposite to the first concave surface; and two lateral surfaces each connecting between a corresponding one of the two flat surfaces and the second concave surface;

wherein a portion of the light that enters the at least one mullion elimination lens via each of the flat surfaces penetrates a corresponding lateral surface, and wherein the remaining portion of the light that enters the at least one mullion elimination lens via each of the flat surfaces is respectively reflected by the corresponding lateral surface to the first concave surface, and by the first concave surface before it passes out from the at least one mullion elimination lens through the second concave surface.

2. The video wall as described in claim 1, wherein the at least one mullion elimination lens is integrally formed of transparent material.

3. A mullion elimination lens for eliminating a mullion of a video wall, the video wall comprising at least two display panels, each of the at least two display panels comprising a main body and a bezel surrounding the main body, the mullion elimination lens comprising:
   a central first concave surface for reflecting internal light incident thereon;
   two flat surfaces respectively attached to the main bodies of two adjacent display panels of the at least two display panels, thereby allowing portions of light emitted by the main bodies of the two adjacent display panels to enter the mullion elimination lens via the flat surfaces;
   a central second concave surface opposite to the first concave surface; and
   two lateral surfaces each connecting between a corresponding one of the two flat surfaces and the second concave surface;
   wherein a portion of the light that enters the mullion elimination lens via each of the flat surfaces penetrates a corresponding lateral surface, and wherein the remaining portion of the light that enters the mullion elimination lens via each of the flat surfaces is respectively reflected by the corresponding lateral surface to the first concave surface, and by the first concave surface before it passes out from the mullion elimination lens through the second concave surface.

4. The mullion elimination lens as described in claim 3, wherein the mullion elimination lens is integrally formed of transparent material.

5. A video wall comprising:
   two display panels, each of the two display panels comprising a main body and a bezel surrounding the main body; and
   a polygonal mullion elimination lens comprising:
      a central first concave surface configured to reflect internal light incident thereon;
      two flat surfaces respectively attached to the main bodies of the two display panels, thereby allowing portions of light emitted by the main bodies of the two display panels to enter the mullion elimination lens via the flat surfaces;
      a central second concave surface opposite to the first concave surface; and
      two lateral surfaces each connecting between a corresponding one of the two flat surfaces and the second concave surface;
         wherein the mullion elimination lens provides light paths for a portion of the light that enters the mullion elimination lens via each of the flat surfaces to penetrate the corresponding lateral surface; and for the remaining portion of the light that enters the mullion elimination lens via each of the flat surfaces to be reflected by the corresponding lateral surface to the first concave surface, and to be reflected by the first concave surface and pass out from the mullion elimination lens through the second concave surface.

6. The video wall as described in claim 5, wherein the mullion elimination lens is integrally formed of transparent material.

* * * * *